(12) United States Patent
Glain et al.

(10) Patent No.: US 11,535,380 B2
(45) Date of Patent: Dec. 27, 2022

(54) ROTATING ARMREST ASSEMBLY

(71) Applicant: Safran Seats USA LLC, Gainesville, TX (US)

(72) Inventors: Arthur Glain, Boulogne-Billancourt (FR); Oscar Ruiz Lara, Versailles (FR)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 17/264,833

(22) PCT Filed: Jul. 31, 2018

(86) PCT No.: PCT/IB2018/055734
§ 371 (c)(1),
(2) Date: Jan. 31, 2021

(87) PCT Pub. No.: WO2020/025999
PCT Pub. Date: Feb. 6, 2020

(65) Prior Publication Data
US 2021/0291987 A1   Sep. 23, 2021

(51) Int. Cl.
*B60N 2/75* (2018.01)
*B64D 11/06* (2006.01)

(52) U.S. Cl.
CPC .......... *B64D 11/0644* (2014.12); *B60N 2/767* (2018.02)

(58) Field of Classification Search
CPC .... B64D 11/0644; B60N 2/767; B60N 2/763; B60N 2002/0212; A47C 7/543
See application file for complete search history.

(56) References Cited

U.S. PATENT DOCUMENTS

| | | | |
|---|---|---|---|
| 3,550,958 A * | 12/1970 | Krein | A47C 7/543 |
| | | | 297/411.32 |
| 4,052,103 A * | 10/1977 | Steinthal | B60N 2/757 |
| | | | 297/411.32 |

(Continued)

FOREIGN PATENT DOCUMENTS

| | | |
|---|---|---|
| EP | 2698276 A1 | 2/2014 |
| JP | S60175159 U | 11/1985 |

OTHER PUBLICATIONS

International Patent Application No. PCT/IB2018/055734, International Search Report and Written Opinion, dated Mar. 29, 2019.

(Continued)

*Primary Examiner* — Philip F Gabler
(74) *Attorney, Agent, or Firm* — Kilpatrick Townsend & Stockton LLP (57) ABSTRACT

An armrest assembly for a passenger seat includes a moveable arm including a proximal end and a distal end, a stowed configuration wherein the moveable arm is disposed adjacent and approximately parallel to a seatback of the passenger seat, and a deployed configuration wherein the moveable arm is approximately parallel to a seat pan of the passenger seat. The moveable arm may include a first portion and a second portion. The armrest assembly may include a first rotation axis such that the moveable arm pivots about the first rotation axis when moving between the stowed configuration and the deployed configuration. The armrest assembly may include a second rotation axis such that the second portion pivots about the second rotation axis relative to the first portion.

11 Claims, 5 Drawing Sheets

(56) References Cited

U.S. PATENT DOCUMENTS

| | | | | |
|---|---|---|---|---|
| 5,104,191 A | * | 4/1992 | Tame | A47C 7/543 |
| | | | | 297/411.32 |
| 5,320,414 A | * | 6/1994 | Spykerman | A47C 7/543 |
| | | | | 297/411.32 |
| 6,513,877 B1 | * | 2/2003 | Ikeda | B60N 2/7017 |
| | | | | 297/411.33 |
| 9,522,618 B2 | * | 12/2016 | Almeida | A47C 7/54 |
| 9,630,720 B2 | * | 4/2017 | Saint-Jaimes | B64D 11/0644 |
| 10,953,777 B1 | * | 3/2021 | Rathore | A47C 7/543 |

OTHER PUBLICATIONS

Europe Patent Application No. 18760036.6, Office Action (Communication pursuant to Article 94(3) EPC), dated Feb. 11, 2022.

* cited by examiner

ROTATING ARMREST ASSEMBLY

FIELD OF THE INVENTION

The field of the invention relates to rotating armrest assemblies for passenger seats in aircraft or the like.

BACKGROUND

In many instances, passenger vehicles, such as aircraft, buses, trains, ships, and automobiles, include passenger seats that are arranged so that each passenger seat may include various movable/deployable components. For example, the passenger seats may include headrests, footrests, and armrests that are movable relative to the seat. To increase a passenger's comfort, many passenger seat backs rotate between upright and reclined positions.

In some instances, an armrest may be disposed adjacent to one or both sides of the seatback of each passenger seat for use by a passenger in the passenger seat. The armrest is deployed by the passenger to provide a relatively flat surface that is ergonomically designed for supporting a passenger's arm/elbow or the arms/elbows of two passengers from adjacent seats.

In certain situations, it may be desirable to design seats and moveable armrest assemblies for supporting a passenger's arm where the armrest, in addition to rotating relative to the passenger seat, rotates about a second axis to maximize a surface area available for supporting the passenger's arm and/or elbow.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, an armrest assembly for a passenger seat comprises: a moveable arm comprising a proximal end and a distal end; a stowed configuration wherein the moveable arm is disposed adjacent and approximately parallel to a seatback of the passenger seat; and a deployed configuration wherein the moveable arm is approximately parallel to a seat pan of the passenger seat, wherein: the moveable arm comprises a first portion and a second portion; the armrest assembly comprises a first rotation axis such that the moveable arm pivots about the first rotation axis when moving between the stowed configuration and the deployed configuration; and the armrest assembly comprises a second rotation axis such that the second portion pivots about the second rotation axis relative to the first portion.

The second rotation axis, in certain embodiments, is approximately perpendicular to the first rotation axis.

In certain embodiments, the second rotation axis is approximately parallel to a line extending between the proximal end and the distal end of the moveable arm.

In some embodiments, the second portion comprises an ergonomic face and a stowing face.

In some embodiments, the ergonomic face is wider and comprises softer materials than the stowing face.

The armrest assembly, in certain embodiments, further comprises an internal rod extending between the first portion and the second portion such that the internal rod is parallel to the second rotation axis.

In some embodiments, the moveable arm comprises: a retracted configuration wherein where the first portion and the second portion are immediately adjacent one another; and an extended configuration where the first portion and the second portion are offset from one another by an armrest gap in an axial direction of the second rotation axis.

The moveable arm, in some embodiments, comprises at least one indexing pin at an interface between the first portion and the second portion to prevent rotation about the second rotation axis.

In certain embodiments, the moveable arm comprises at least one limit portion to limit rotation of the first portion and the second portion relative to one another to approximately 90°.

In some embodiments, rotation of the moveable arm about the first rotation axis causes an automatic rotation of the second portion about the second rotation axis relative to the first portion.

In certain embodiments, movement of the moveable arm toward the deployed configuration causes an ergonomic face of the second portion to rotate toward an upper part of the second portion; and movement of the moveable arm toward the stowed configuration causes the ergonomic face of the second portion to rotate away from an upper part of the second portion such that a stowing face rotates toward an upper part of the second portion.

According to certain embodiments of the present invention, a passenger seat comprises: a first seatback, a second seatback, and a gap between the first and second seatbacks; a first seat pan aligned with the first seatback and a second seat pan aligned with the second seatback; an armrest assembly comprising: a moveable arm comprising a proximal end and a distal end; a stowed configuration wherein the moveable arm is disposed in the gap such that the moveable arm is approximately parallel to the first seatback and the second seatback; and a deployed configuration wherein the moveable arm is approximately parallel to the first seat pan and the second seat pan, wherein: the moveable arm comprises a first portion and a second portion; the armrest assembly comprises a first rotation axis such that the moveable arm pivots about the first rotation axis when moving between the stowed configuration and the deployed configuration; and the armrest assembly comprises a second rotation axis such that the second portion pivots about the second rotation axis relative to the first portion.

In some embodiments, the second rotation axis is approximately perpendicular to the first rotation axis.

The second rotation axis, in certain embodiments, is approximately parallel to a line extending between the proximal end and the distal end of the moveable arm.

In certain embodiments, the second portion comprises an ergonomic face and a stowing face.

In some embodiments, the ergonomic face is wider than the stowing face; and a width of stowing face is approximately equal to a width of the gap.

The moveable arm, in some embodiments, comprises: a retracted configuration wherein where the first portion and the second portion are immediately adjacent one another; and an extended configuration where the first portion and the second portion are offset from one another by an armrest gap in an axial direction of the second rotation axis.

In certain embodiments, the moveable arm comprises at least one indexing pin at an interface between the first portion and the second portion to prevent rotation about the second rotation axis.

The moveable arm, in certain embodiments, comprises at least one limit portion to limit rotation of the first portion and the second portion relative to one another to approximately 90°.

In some embodiments, rotation of the moveable arm about the first rotation axis causes an automatic rotation of the second portion about the second rotation axis relative to the first portion; movement of the moveable arm toward the deployed configuration causes an ergonomic face of the second portion to rotate toward an upper part of the second portion; and movement of the moveable arm toward the stowed configuration causes the ergonomic face of the second portion to rotate away from an upper part of the second portion such that a stowing face rotates toward an upper part of the second portion.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

FIGS. 1A-4 illustrate embodiments of rotating armrest assemblies 100 for passenger seats in vehicles such as an aircraft. The rotating armrest assembly 100 may include a moveable arm 101 disposed adjacent to at least one seatback (such as seatback 11a and/or seatback 11b). The moveable arm 101 may include a first portion 102 at a proximal end 111 and a second portion 103 at a distal end 112. In some embodiments, the moveable arm 101 rotates about a first rotation axis a to move between a deployed configuration (see FIG. 1A) and a stowed configuration (see FIG. 1C). In some cases, when in the deployed configuration, the moveable arm 101 is approximately parallel to a seat pan (12a and/or 12b) of the passenger seat. In some cases, when in the stowed configuration, the moveable arm 101 is approximately parallel to a seatback (11a and/or 11b) of the passenger seat and fits within gap 21 between seatback 11a and 11b.

Figure 1A:
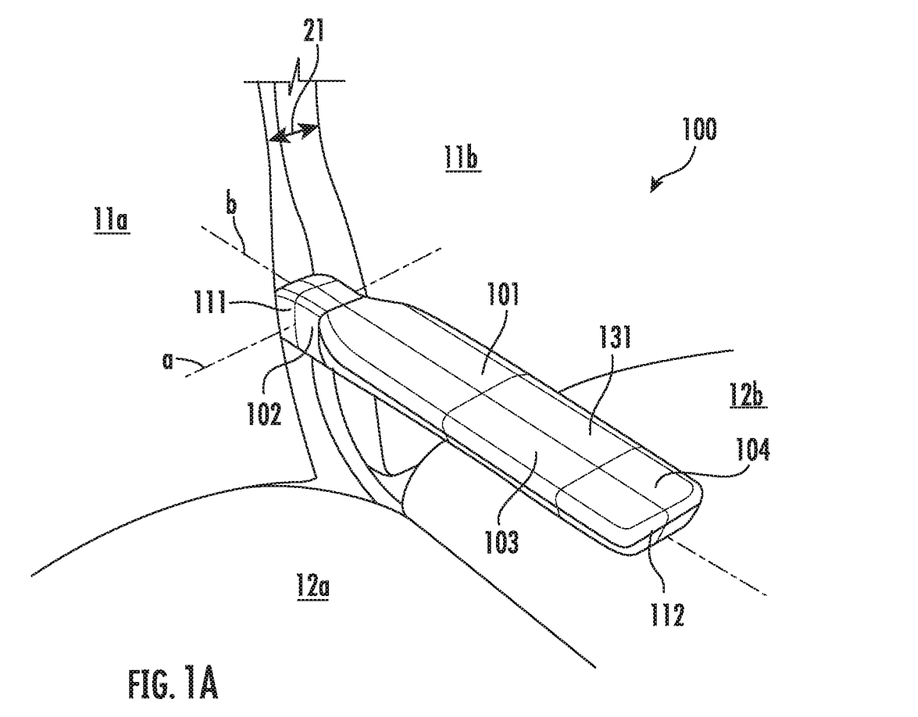
FIG. 1A is a front perspective view of a rotating armrest assembly in a deployed configuration according to certain embodiments of the present invention.
Figure 1B:
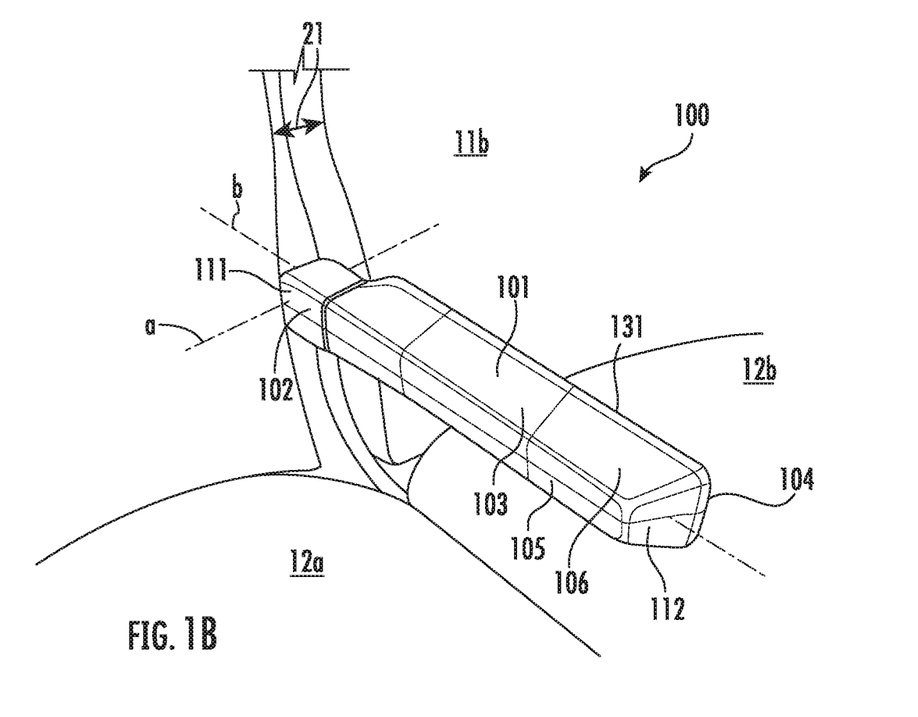
FIG. 1B is a front perspective view of the rotating armrest assembly of FIG. 1A in a rotated configuration.
Figure 1C:
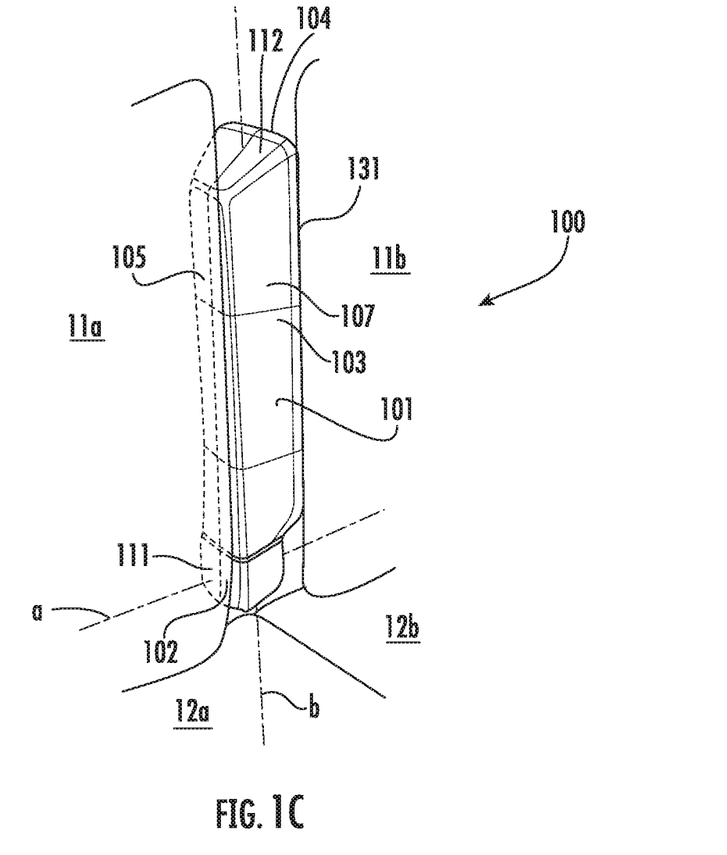
FIG. 1C is a front perspective view of the rotating armrest assembly of FIG. 1A in a stowed configuration.
Figure 2A:
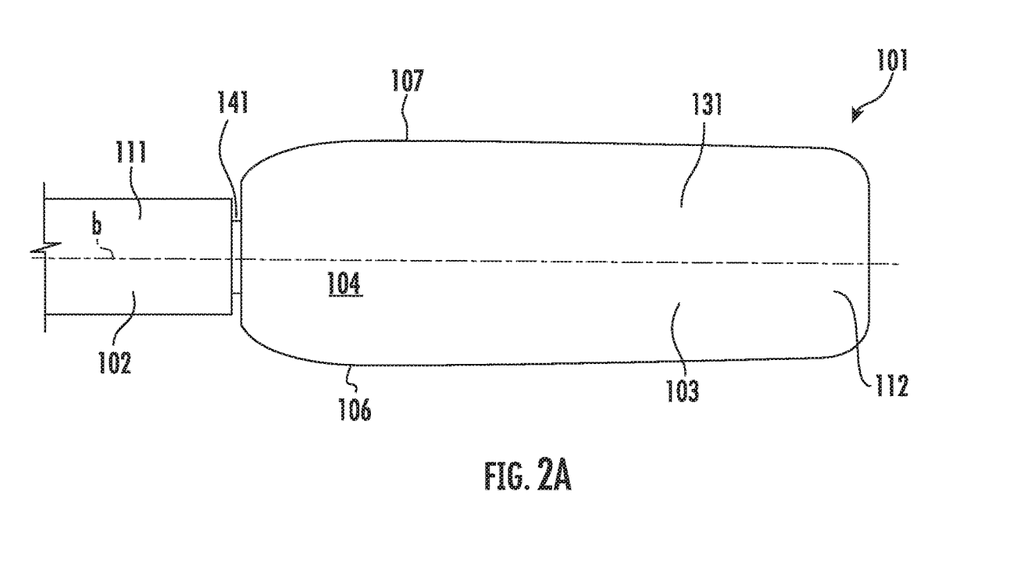
FIG. 2A is a top view of the rotating armrest assembly of FIG. 1A in the deployed configuration.
Figure 2B:
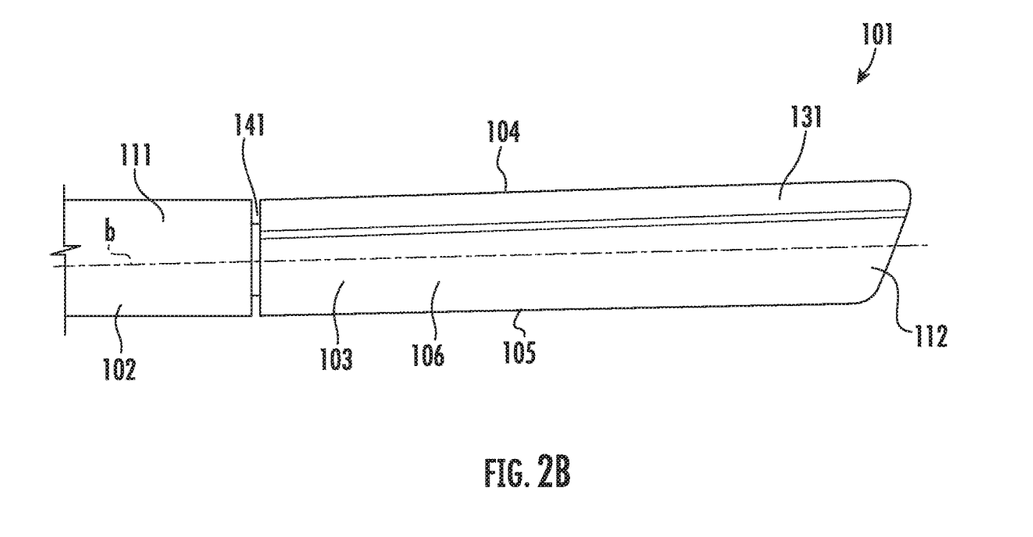
FIG. 2B is a top view of the rotating armrest assembly of FIG. 1A in the rotated configuration.

In some embodiments, the second portion 103 rotates about a second rotation axis b to move between the deployed configuration (see FIGS. 1A and 2A) and a rotated configuration (see FIGS. 1B and 2B). The second rotation axis b may be approximately perpendicular to the first rotation axis a. In some cases, the second rotation axis b may be approximately parallel to a line extending between the proximal end 111 and the distal end 112 of the moveable arm 101. The second portion 103 may include multiple faces such that (1) an ergonomic face 104 faces upward at an upper part of the second portion 103 when the rotating armrest assembly 100 is in the deployed configuration (see FIGS. 1A and 2A) and (2) a stowing face 106 faces upward at an upper part of the second portion 103 when the rotating armrest assembly 100 is in the rotated configuration (see FIGS. 1B and 2B). As shown in FIGS. 1A-2B, the ergonomic face 104 may include cushion 131 for interfacing with an arm and/or elbow of a passenger. In some embodiments, the second portion 103 includes a lower surface 105 that is opposite from the ergonomic face 104 and a rear stowing face 107 that is opposite from the stowing face 106. When the rotating armrest assembly 100 is in the stowed position (FIG. 1C), the rear stowing face 107 is visible such that the rear stowing face 107 is approximately flush with the surface of the seatback 11a and/or seatback 11b. In some cases, the lower surface 105 is narrower than the ergonomic face 104.

As shown in FIGS. 2A and 2B, the ergonomic face 104 may be wider than the stowing face 106 such that the stowing face 106 may be approximately the same width as the first portion 102 (which does not rotate relative to the second rotation axis b). In some embodiments, the stowing face 106 and the first portion 102 are approximately 3.81 cm (1.5") to 5.08 cm (2") wide to ensure these components fit within gap 21. In some embodiments, the ergonomic face 104 is at least 7.62 cm (3") wide. The ergonomic face 104 may be 7.62 cm (3") wide, 8.89 cm (3.5") wide, 10.16 cm (4") wide, or any other appropriate width greater than 7.62 cm (3"). In some embodiments, the width of the ergonomic face 104 is approximately 150% to 250% of the width of the stowing face 106. Based on the width of the ergonomic face 104, in some cases, the rotating armrest assembly 100 must be in the rotated configuration to allow the rotating armrest assembly 100 to move to the stowed configuration (i.e., the ergonomic face 104 is too wide to fit within gap 21). In other words, the ergonomic face 104 has a sufficient width such that rotating the moveable arm 101 upward about the first rotation axis a from the position shown in FIG. 1A would cause the ergonomic face 104 to impinge on the surface of seatback 11a and/or seatback 11b thus preventing the moveable arm 101 from moving to the stowed configuration. Although narrower than the ergonomic face 104, the stowing face 106 may still be functional as an armrest surface such that the moveable arm 101 can be used as an armrest in the rotated configuration (see FIGS. 1B and 2B). In some embodiments, the stowing face 106 may include padding or soft materials.

In some embodiments, to reach the stowed configuration (see FIG. 1C), the second portion 103 must rotate about the second rotation axis b (such that the ergonomic face 104 is a lateral surface of the moveable arm 101, as shown for the rotated configuration). In between the first portion 102 and the second portion 103, the rotating armrest assembly 100 may include an armrest gap 141 (as shown in FIGS. 2A-4). The rotating armrest assembly 100 may include an internal rod 142 extending across the armrest gap 141 between the first portion 102 and the second portion 103 where the axial direction of the internal rod 142 is approximately parallel to the second rotation axis b. The armrest gap 141 may be apparent only when the second portion 103 is pulled in the axial direction of axis b away from the first portion 102. In other words, the moveable arm 101 may include (i) a retracted configuration where the first portion 102 and the second portion 103 are immediately adjacent and/or contacting one another (see FIG. 1A) and (ii) an extended configuration where the first portion 102 and the second portion 103 are offset from one another by the armrest gap 141 (see FIGS. 2A-4). The rotating armrest assembly 100 may include a biasing portion to bias the moveable arm 101 toward at least one of the retracted configuration and the extended configuration. The biasing portion may include at least one of a spring, a detent, a latch, or any other appropriate component. The biasing portion may be located partially or entirely inside the internal rod 142.

Figure 3:
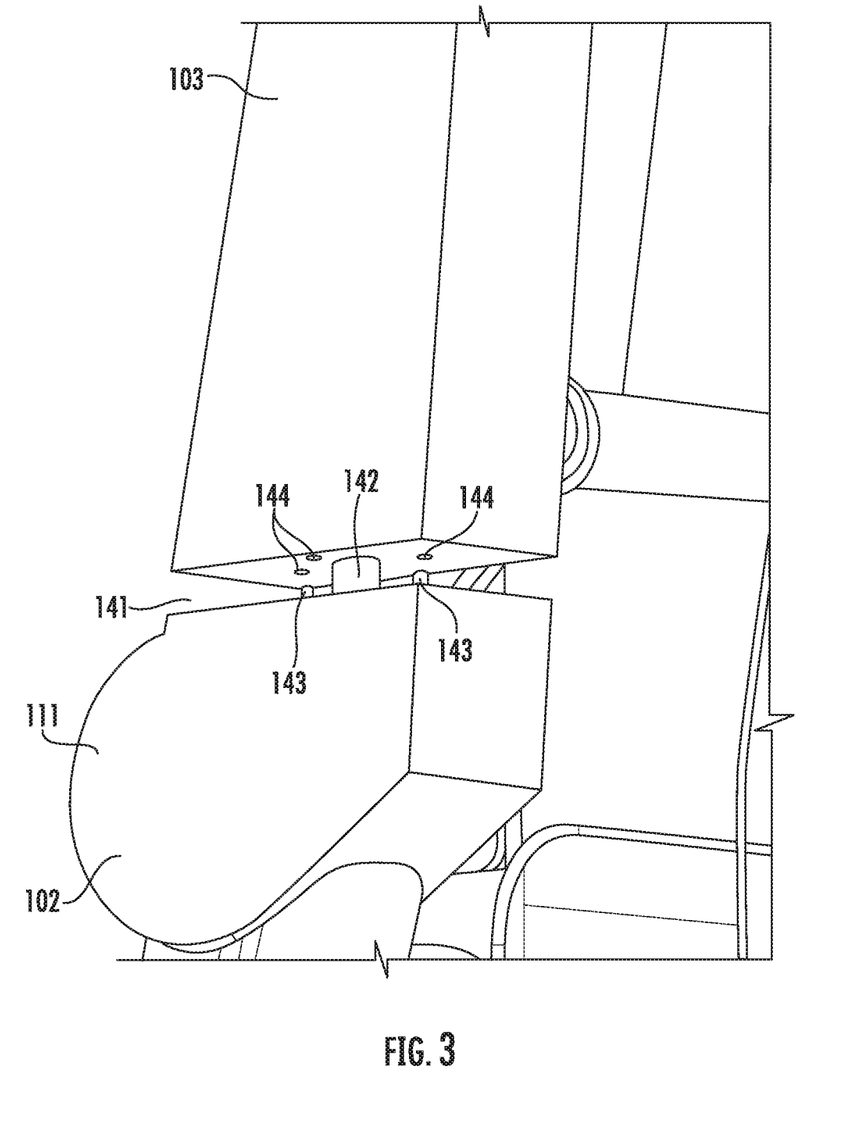
FIG. 3 is a partial perspective view of the rotating armrest assembly of FIG. 1A.
Figure 4:
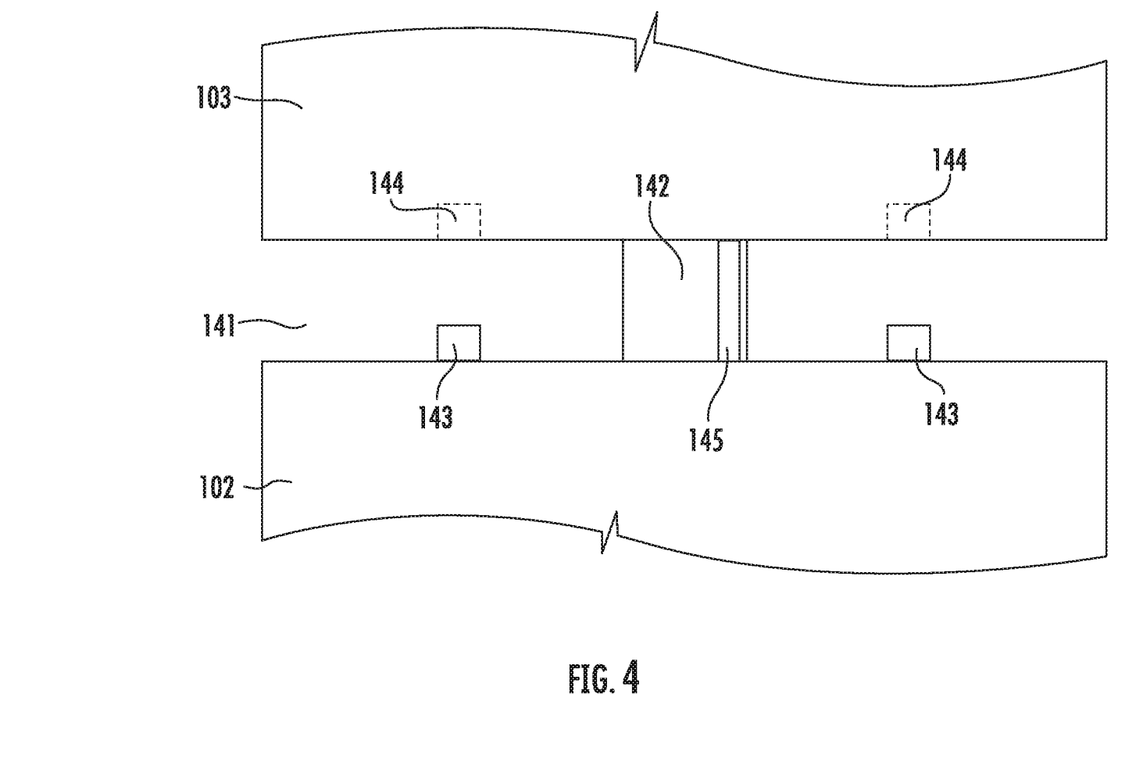
FIG. 4 is a side view of a joint of the rotating armrest assembly of FIG. 1A.

When the moveable arm 101 is in the retracted configuration, the moveable arm 101 may include at least one rotation control portion to limit rotational movement of the second portion 103 relative to the first portion 102. The at least one rotation control portion may include at least one indexing pin 143 that engages a corresponding hole 144 to constrain the second portion 103 relative to the first portion 102. In some embodiments, there is at least one hole 144 corresponding to the deployed configuration (FIGS. 1A and 2A) and at least one hole 144 corresponding to the rotated configuration (FIGS. 1B and 2B). In some embodiments, there are two pins 143 extending between the second portion 103 and the first portion 102. The pins 143 may extend from the second portion 103 (such that the first portion 102 includes corresponding holes 144), or, as shown in FIGS. 3 and 4, the pins 143 may extend from the first portion 102 (such that the second portion 103 includes corresponding holes 144).

In addition to the indexing pin(s) 143 and corresponding hole(s) 144 for constraining the second portion 103 relative to the first portion 102, the at least one rotation control portion may include at least one limit portion that defines maximum rotation for the second portion 103 relative to the first portion 102 (i.e., that limits rotation about the second rotation axis b at all times, including both the retracted configuration and the extended configuration). For example, as shown in FIG. 4, the internal rod 142 may include a portion 145 (e.g., a protrusion or a keyway) that interfaces with the first portion 102 and/or the second portion 103 that limits rotational movement. The portion 145 may limit rotational movement of the second portion 103 relative to the first portion 102 to approximately 90°. In other embodiments, when the moveable arm 101 is in the extended configuration, the second portion 103 is free to rotate relative to the first portion 102.

In some embodiments, rotation of the moveable arm 101 in at least one direction about axis a automatically causes rotation to occur about axis b. For example, in some cases, when the rotating armrest assembly 100 is in the deployed configuration (FIGS. 1A and 2A), rotational movement of the moveable arm 101 about axis a (toward the seatbacks 11a and 11b) causes the second portion 103 to rotate (relative to first portion 102) about rotation axis b such that the ergonomic face 104 moves from an orientation facing upward to an orientation facing a lateral direction (e.g., as shown in FIGS. 1B and 1C). In some embodiments, when the rotating armrest assembly 100 is in the stowed configuration (FIG. 1C), rotational movement of the moveable arm 101 about axis a (toward the seat pans 12a and 12b) causes the second portion 103 to rotate (relative to first portion 102) about rotation axis b such that the ergonomic face 104 moves from an orientation facing a lateral direction to an orientation facing an upward direction (e.g., as shown in FIG. 1A). In other embodiments, rotational movement about axis a and rotational movement about axis b are independent of one another.

The components of the rotating armrest assembly 100 may be formed of materials including, but not limited to, aluminum, steel, titanium, carbon composite, graphite composite, polyester, nylon, plastic, thermoplastic, other fabric materials, stainless steel, other plastic or polymer materials, other metallic materials, other composite materials, or other similar materials. Moreover, the components of the rotating armrest assembly 100 may be attached to one another via suitable fasteners, which include, but are not limited to, screws, bolts, rivets or other mechanical or chemical fasteners.

In the following, further examples are described to facilitate understanding of aspects of the invention:

Example A. An armrest assembly for a passenger seat comprising:

a moveable arm comprising a proximal end and a distal end;

a stowed configuration wherein the moveable arm is disposed adjacent and approximately parallel to a seatback of the passenger seat; and a deployed configuration wherein the moveable arm is approximately parallel to a seat pan of the passenger seat, wherein:

the moveable arm comprises a first portion and a second portion;

the armrest assembly comprises a first rotation axis such that the moveable arm pivots about the first rotation axis when moving between the stowed configuration and the deployed configuration; and the armrest assembly comprises a second rotation axis such that the second portion pivots about the second rotation axis relative to the first portion.

Example B. The armrest assembly of Example A or any of the preceding or subsequent examples, wherein the second rotation axis is approximately perpendicular to the first rotation axis.

Example C. The armrest assembly of Example A or any of the preceding or subsequent examples, wherein the second rotation axis is approximately parallel to a line extending between the proximal end and the distal end of the moveable arm.

Example D. The armrest assembly of Example A or any of the preceding or subsequent examples, wherein the second portion comprises an ergonomic face and a stowing face.

Example E. The armrest assembly of Example D or any of the preceding or subsequent examples, wherein the ergonomic face is wider and comprises softer materials than the stowing face.

Example F. The armrest assembly of Example A or any of the preceding or subsequent examples, further comprising an internal rod extending between the first portion and the second portion such that the internal rod is parallel to the second rotation axis.

Example G. The armrest assembly of Example A or any of the preceding or subsequent examples, wherein the moveable arm comprises:

a retracted configuration wherein where the first portion and the second portion are immediately adjacent one another; and an extended configuration where the first portion and the second portion are offset from one another by an armrest gap in an axial direction of the second rotation axis.

Example H. The armrest assembly of Example A or any of the preceding or subsequent examples, wherein the moveable arm comprises at least one indexing pin at an interface between the first portion and the second portion to prevent rotation about the second rotation axis.

Example I. The armrest assembly of Example A or any of the preceding or subsequent examples, wherein the moveable arm comprises at least one limit portion to limit rotation of the first portion and the second portion relative to one another to approximately 90°.

Example J. The armrest assembly of Example A or any of the preceding or subsequent examples, wherein rotation of the moveable arm about the first rotation axis causes an automatic rotation of the second portion about the second rotation axis relative to the first portion.

Example K. The armrest assembly of Example J or any of the preceding or subsequent examples, wherein:

movement of the moveable arm toward the deployed configuration causes an ergonomic face of the second portion to rotate toward an upper part of the second portion; and movement of the moveable arm toward the stowed configuration causes the ergonomic face of the second portion to rotate away from an upper part of the second portion such that a stowing face rotates toward an upper part of the second portion.

Example L. A passenger seat comprising:

a first seatback, a second seatback, and a gap between the first and second seatbacks;

a first seat pan aligned with the first seatback and a second seat pan aligned with the second seatback;

an armrest assembly comprising:

a moveable arm comprising a proximal end and a distal end;

a stowed configuration wherein the moveable arm is disposed in the gap such that the moveable arm is approximately parallel to the first seatback and the second seatback; and a deployed configuration wherein the moveable arm is approximately parallel to the first seat pan and the second seat pan, wherein:

the moveable arm comprises a first portion and a second portion;

the armrest assembly comprises a first rotation axis such that the moveable arm pivots about the first rotation axis when moving between the stowed configuration and the deployed configuration; and the armrest assembly comprises a second rotation axis such that the second portion pivots about the second rotation axis relative to the first portion.

Example M. The passenger seat of Example L or any of the preceding or subsequent examples, wherein the second rotation axis is approximately perpendicular to the first rotation axis.

Example N. The passenger seat of Example L or any of the preceding or subsequent examples, wherein the second rotation axis is approximately parallel to a line extending between the proximal end and the distal end of the moveable arm.

Example O. The passenger seat of Example L or any of the preceding or subsequent examples, wherein the second portion comprises an ergonomic face and a stowing face.

Example P. The passenger seat of Example O or any of the preceding or subsequent examples, wherein:

the ergonomic face is wider than the stowing face; and a width of stowing face is approximately equal to a width of the gap.

Example Q. The passenger seat of Example L or any of the preceding or subsequent examples, wherein the moveable arm comprises:

a retracted configuration wherein where the first portion and the second portion are immediately adjacent one another; and an extended configuration where the first portion and the second portion are offset from one another by an armrest gap in an axial direction of the second rotation axis.

Example R. The passenger seat of Example L or any of the preceding or subsequent examples, wherein the moveable arm comprises at least one indexing pin at an interface between the first portion and the second portion to prevent rotation about the second rotation axis.

Example S. The passenger seat of Example L or any of the preceding or subsequent examples, wherein the moveable arm comprises at least one limit portion to limit rotation of the first portion and the second portion relative to one another to approximately 90°.

Example T. The passenger seat of Example L or any of the preceding or subsequent examples, wherein:

rotation of the moveable arm about the first rotation axis causes an automatic rotation of the second portion about the second rotation axis relative to the first portion;

movement of the moveable arm toward the deployed configuration causes an ergonomic face of the second portion to rotate toward an upper part of the second portion; and movement of the moveable arm toward the stowed configuration causes the ergonomic face of the second portion to rotate away from an upper part of the second portion such that a stowing face rotates toward an upper part of the second portion.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. An armrest assembly for a passenger seat comprising:
a moveable arm comprising:
a first rotation axis;
a second rotation axis;
a first portion comprising a first end and a second end opposite the first end, the first end of the first portion defining a proximal end of the moveable arm, the first portion rotatable about the first rotation axis;
a second portion comprising a first end and a second end opposite the first end, the second end of the second portion defining a distal end of the arm from opposite the proximal end, wherein the second portion is rotatable relative to the first portion and about the second rotation axis, wherein the second portion comprises an ergonomic face, a lower face opposite the ergonomic face, and a stowing face between the ergonomic face and the lower face, wherein a width of the ergonomic face is greater than a width of the stowing face and greater than a width of the lower face; and an internal rod extending from the first portion to the second portion, wherein the internal rod extends parallel to the second rotation axis, wherein an outer surface of the rod comprises a limiting portion, wherein the first portion is rotatable about the first rotation axis such that the moveable arm is positionable about the first rotation axis between a stowed configuration and a deployed configuration, wherein, in the deployed position, the moveable arm extends in a lateral direction, and wherein, in the stowed configuration, the moveable arm extends in an upward direction, wherein the second portion is rotatable about second rotation axis relative to the first portion such that the second portion is positionable about the second rotation axis between a base configuration and a rotated configuration, wherein, in the base configuration and in the deployed configuration, the ergonomic face faces upward and the stowing face faces a lateral direction, wherein, in the rotated configuration and in the deployed configuration, the ergonomic face faces the lateral direction, the stowing face faces upward, and a surface of the first portion and a surface of the second portion extend in the same plane, wherein the moveable arm further comprises:
an indexing pin at an interface between the first portion and the second portion, wherein the interface comprises the second end of the first portion and the first end of the second portion, and wherein the second end of the first portion and the first end of the second portion face each other, wherein the indexing pin extends outwards from at least one of the second end of the first portion or the first end of the second portion;
a first opening corresponding to the base configuration; and
a second opening corresponding to the rotated configuration,
wherein the first opening and the second opening are defined in the first end of the second portion or the second end of the first portion opposite from the indexing pin, and
wherein the indexing pin is engageable with the first opening and the second opening to prevent rotation about the second rotation axis, wherein the second portion is linearly movable along the second rotation axis relative to the first portion between a retraced configuration and an extended configuration, wherein:
in the retracted configuration, the first portion and the second portion are immediately adjacent one another and the indexing pin is engaged with the first opening or the second opening, wherein, in the retracted configuration, the limiting portion of the internal rod limits rotation of the first portion relative to the second portion; and
in the extended configuration, the first portion and the second portion are spaced apart from one another by an armrest gap, and a distance between the first portion and the second portion in the extended position is greater than a distance between the first portion and the second portion in the retracted position, wherein, in the extended configuration, the first portion is freely rotatable relative to the second portion.

2. A passenger seat comprising:
the armrest assembly of claim 1,
a first seatback, a second seatback, and a gap between the first and second seatbacks; and
a first seat pan aligned with the first seatback and a second seat pan aligned with the second seatback.

3. The passenger seat of claim 2, wherein the second rotation axis is approximately perpendicular to the first rotation axis.

4. The passenger seat of claim 2, wherein a width of stowing face is approximately equal to a width of the gap between seatbacks.

5. The armrest assembly of claim 1, wherein the second rotation axis is approximately perpendicular to the first rotation axis.

6. The armrest assembly of claim 1, wherein the second rotation axis is approximately parallel to a line extending between the proximal end and the distal end of the moveable arm.

7. The armrest assembly of claim 1, wherein the ergonomic face comprises softer materials than the stowing face.

8. A passenger seat comprising:
the armrest assembly of claim 1;
a first seatback, a second seatback, and a gap between the first and second seatbacks; and
a first seat pan aligned with the first seatback and a second seat pan aligned with the second seatback;
wherein, a width of stowing face is approximately equal to a width of the gap between seatbacks.

9. The armrest assembly of claim 1, wherein:
rotation of the moveable arm about the first rotation axis causes an automatic rotation of the second portion about the second rotation axis relative to the first portion.

10. The armrest assembly of claim 9, wherein:
movement of the moveable arm from the stowed configuration toward the deployed configuration causes the ergonomic face of the second portion to rotate to face upward; and
movement of the moveable arm from the deployed configuration toward the stowed configuration causes the ergonomic face of the second portion to rotate toward the lateral direction.

11. The armrest assembly of claim 1, wherein indexing pin extends parallel to the second rotation axis.

* * * * *